(12) United States Patent
Son

(10) Patent No.: US 8,400,402 B2
(45) Date of Patent: Mar. 19, 2013

(54) ELECTRONIC DEVICE HOUSING WITH INTEGRATED USER INPUT CAPABILITY

(75) Inventor: Jae S. Son, Rancho Palos Verdes, CA (US)

(73) Assignee: Pressure Profile Systems, Inc., Los Angeles, CA (US)

( * ) Notice: Subject to any disclaimer, the term of this patent is extended or adjusted under 35 U.S.C. 154(b) by 662 days.

(21) Appl. No.: 12/566,768

(22) Filed: Sep. 25, 2009

(65) Prior Publication Data

US 2010/0013775 A1    Jan. 21, 2010

Related U.S. Application Data

(63) Continuation-in-part of application No. 11/697,026, filed on Apr. 5, 2007, now Pat. No. 7,595,788.

(60) Provisional application No. 60/792,379, filed on Apr. 14, 2006.

(51) Int. Cl.
*G09G 5/00* (2006.01)

(52) U.S. Cl. .............................. 345/168; 345/169; 341/22

(58) Field of Classification Search .................. None
See application file for complete search history.

(56) References Cited

U.S. PATENT DOCUMENTS

| 4,224,615 | A  | * | 9/1980  | Penz ............................ 345/174 |
| 2003/0234769 | A1 | * | 12/2003 | Cross et al. ................... 345/173 |
| 2006/0197750 | A1 | * | 9/2006  | Kerr et al. .................... 345/173 |
| 2006/0274042 | A1 | * | 12/2006 | Krah et al. .................... 345/163 |

* cited by examiner

*Primary Examiner* — Andrew L Sniezek
(74) *Attorney, Agent, or Firm* — Boris Leschinsky

(57) ABSTRACT

An electronic device housing with a seamless user input zone that measures the level of force applied by the user is described. It is particularly advantageous when used with small hand-held consumer electronic devices such as mobile phones, PDAs, game—and media players. A housing for an electronic device includes a seamless user input zone defining a contact force-sensitive deformable area. A capacitance sensor is formed between the conductive inside surface of the housing and the electrode of the rigid base facing that inside surface. Linear support elements such as columns support the housing away from the rigid base defining an air gap. Capacitance measurement circuit is deployed to detect the location and progressively increasing levels of force applied by the user onto the housing and send a user input signal to the electronic device.

10 Claims, 4 Drawing Sheets

A

B

C

D

ELECTRONIC DEVICE HOUSING WITH INTEGRATED USER INPUT CAPABILITY

CROSS-REFERENCE DATA

This application claims priority of the U.S. Provisional Patent Application No. 60/792,379 filed 14 Apr. 2006 with the same title and incorporated herein in its entirety by reference. It is also a continuation-in-part of the U.S. patent application Ser. No. 11/697,026 with the same title filed 5 Apr. 2007, now U.S. Pat. No. 7,595,788.

FIELD OF THE INVENTION

The present invention generally relates to electronic devices with housings incorporating user input means based on contact force sensing. More specifically, the invention relates to a hand-held electronic device with a portion of a housing adapted to serve as a contact force-sensitive user input zone. In particular, the user input zone comprises a capacitance tactile sensor built using the housing itself as one of the electrodes thus obviating the need for separate input devices to protrude through the housing.

BACKGROUND

There exist today many types of consumer electronic devices, each of which utilizes some sort of user input and interface. The user interface typically includes an output device in the form of a fixed display such as an LCD and one or more input devices, which can be mechanically actuated as for example, switches, buttons, keys, dials, joysticks, navigation pads, or electrically activated as for example touch pads and touch screens. The display is typically configured to present visual information such as text and graphics, and the input devices are typically configured to perform operations such as issuing commands, making selections or moving a cursor in the consumer electronic device. Each of these well known devices has considerations such as size and shape limitations, costs, functionality, complexity, etc. that must be taken into account when designing the consumer electronic device. In most cases, the user interface is positioned on the front face of the electronic device for easy viewing of the display and easy manipulation of the input devices. Examples of hand-held electronic devices include mobile phones, PDAs, remote controls, various media and game players, and other navigation and communication devices.

Modern seamless look is one of the desired marketing aspects of present-day electronic devices. Incorporation of user input into the design of such devices without resorting to traditional buttons and switches allows manufacturers to present their devices to consumers in the most positive light. Force-sensitive zones on the device housing may serve just such purpose. In comparison to similar input devices that sense electrical proximity of the person's finger, the present invention allows force-controlled proportional signal recognition that can be used to enhance the user operation of the electronic device. Examples of such enhancements include pressure-based scroll, zoom, and multiple activation levels: light touch+motion only moves a cursor while hard touch+motion grabs and moves an object simulating real world environments.

Conventional touch-sensitive proximity sensors include a conductive electrode covered with an insulating dielectric layer. Touching the proximity sensor by a finger causes a change in capacitance of the electrode because the finger serves as an electrical ground due to a slightly conductive nature of human tissue. That change and the location of the touch point are then detected by the control circuitry and used as an input signal for the electronic device. However, the level of signal does not correlate well with the actual amount of force applied to the sensor: a small finger can exert much higher force yet yield a smaller amount of signal when compared to a larger finger causing a larger contact area. Thus, using a conventional touch-sensitive proximity sensor for applications such as on an Iphone or Ipod is not suitable as a proportional force-sensitive input device.

Traditionally, touch-sensitive zones incorporated in the device housing are made using proximity sensors such as capacitance electrode on the inside surface of the housing. One additional limitation of such proximity sensors is that the user cannot wear gloves or use a non-conductive object like a pencil when interacting with the device. A glove insulates the finger from the sensor precluding the proper function of the device. The need exists therefore for a touch-sensitive input device capable of working with both conductive and non-conductive user input objects such as a gloved finger or a stylus.

Another known method of sensing the touch of the user through the housing is done by having a thin compressible portion of the housing placed in firm contact with the strain gauge sensor located inside the device. Piezoelectric strip can be used as such a sensor. Pressure from the finger of the user is transmitted as deflection through the deformable housing and sensed as a changed strain through the housing surface by the strain gauge sensor. The signal from the sensor is then used as an input command by the electronic circuitry of the device. This approach requires the device to incorporate several separate components that have to be assembled together to make it work, making manufacturing processes quite complicated and costly.

Examples of devices using this concept are disclosed in the U.S. Pat. Nos. 5,555,894; 6,040,823; 6,945,981; and US Patent Applications Nos. 2003/0076306; 2006/0197750; and 2006/0197753, all incorporated herein by reference in their entirety. The need exists for a simplified touch-sensitive housing that can inherently serve as an input device.

SUMMARY OF THE INVENTION

Two fundamentally different types of touch sensors that are known to exist today can be described as follows:
  Deformation-based capacitive sensors that generate a signal responsive to deformation of at least one of the conductive layers whereby causing these layers to come closer together at the location of such deformation, and
  Non-deformation based proximity sensors detecting a presence in their vicinity of a ground electrode object such as a conductive pointing device or a finger of a user—a change in capacitance is detected at a location of such ground object without any physical deformation of the sensor itself.

On the one hand, operation of a proximity sensor of the second type independently of mechanical deformation of the sensor surface makes it easy for incorporating into a housing of an electronic device. On the other hand, using of a sensor of the first type in the same configuration is much more problematic and not obvious due to the reliance of this sensor on a repeatable and consistent deformation of at least one conductive layer to achieve satisfactory performance.

As can be seen in FIGS. 1 and 7, bending or deformation of the top conductive layer is heavily dependent on the mechanical conditions and location of the bending surface. The same force applied in the middle of the sensor area would produce a different degree of deformation as compared to the deformation at the edge of the sensor area. This difference in deformation depending on a particular location of where the deforming force is applied is one of the key factors why this type of sensor has not been used in applications where there is no consistently flat surface available for reliable sensor operation. Prior art in deformable touch sensors describes them as stand-alone components that can be incorporated in various devices because the touch-sensitive area is flat and so achieving uniform response is relatively easy.

Housing of an electronic device on the other hand typically has a highly complicated and curved surface as can be easily appreciated by observing various typical examples of these devices like cell phones, PDAs, music players, etc. Due to their small size, it is desirable to extend user input area into curved areas of the housing. Curvature of these surfaces would make the operation of the touch sensor of the first type questionable as it still relies on consistent deformation in various places thereof in response to the same force applied over various locations.

The present invention addresses the above need by providing a housing for an electronic device with integrated proportional user input capability. More specifically, disclosed herein is a sensing device where the electronic housing itself (which is either made from metal or has an inside conductive surface) is used as a deformable structure for a tactile sensor device. A capacitance force sensor is created between the conductive inside surface of the housing serving as a first conductive layer and a rigid non-deformable base having a second conductive layer facing the first conductive layer and spaced apart therefrom at a predetermined gap. This pair of conductive layers separated by a dielectric layer containing a non-conductive material, such as air, together makes a capacitance sensor. Compression of the housing deforms the first conductive layer and brings it closer to the second conductive layer changing therefore the level of capacitance therebetween. This in turn allows for capacitance-based electrical detection of both the event of user-applied pressure or force on a selected user input zone of the housing as well as the level of force applied to the housing. Both the event of compression of the housing in a particular location and the degree of this compression can be used as user input signals for the electronic device.

In comparison with traditional membrane switches, this invention allows the product design to be clean and free of lines and seams associated with conventional buttons. In contrast to recently popular touch switches that detect the presence of a human finger or a conductive object, this approach is also able to work with non-conductive objects such as a person wearing a glove and measure the level of force applied by the user in a proportional sense.

Prior art resistive touch screens are flat and use two transparent conductive layers that deform with applied pressure. They have not been implemented into a complex curved shape such as a seemless electronic housing. They also have not been able to measure proportional force that is applied onto them since the physical contact between the two layers needs to occur for it to provide an input signal. By sensing the capcitance between the two electrodes, a proportional analog signal can be measured and smaller amounts of deflections can be used to provide a more robust seamless housing design in comparison to resistive touch screens. The input of the present invention also does not have to have a flat surface or noticible surface transitions as present in membrane switches.

More recently, manufacturing process have developed methods allowing metalization of the inside and embedded into the housing, even if the housing is very organic and curved in shape, for example a co-laminated/molded process or pre-printed and then formed process such as RF antennas and metallic decorative prints. This allows more flexibility in defining the location, shape, and grounding methods of the electrode embedded into the housing versus the traditional spray and sputtered coated processes.

Implementation of this invention requires availability of a sensitive capacitance sensing circuit that can detect very small (less than 0.001") deflections in the housing as well as an integrated sensor housing design that controls deflection levels, peak versus average deformation, cross talk between adjacent elements, compensation for sensitivity differences between the center of the housing versus the corner, etc.

By adjusting the thickness of the housing, an aluminum cover can be made to deflect identically to ABS cover. If the ABS cover has uniform thickness of 1.00 mm, the corresponding thickness values for aluminum cover are 0.31 mm, following a rule that displacement results are consistent for constant values of the product $Et^3$, where E is the modulus of elasticity of the cover material and t is the cover thickness.

For one particular housing configuration, when a force of 4.0 N is applied over a circle 7 mm in diameter, centered over one input zone, the maximum deflections were approximately 0.5 thousandth of an inch and an average deflection over the input zone was 0.2 thousandths of an inch.

This invention may be used advantageously with reconfigurable or other tactile sensor input devices disclosed elsewhere by the same inventor and also those that are known in the art. It can also be configured to work together with a vibration or tactile feedback mechanism where the activation threshold of a button is software-controlled. This allows a strong person to set the activation level at a higher force level than a person with more gentle touch or to adjust the activation threshold based on the amount of sensed acceleration due to activity.

This invention can be used to replace or improve the following technologies and devices:
  Descrete button switches that at present require separate components and are only binary;
  Mechanical dome switches located under compliant skin or other flexible membranes;
  Touch pads on laptops that at present only detect contact location and not force;
  Ipod scroll wheel that at present does not detect force;
  Side keys on a phone; and
  Analog joysticks such as found on a Thinkpad Laptop

BRIEF DESCRIPTION OF THE DRAWINGS

A more complete appreciation of the subject matter of the present invention and the various advantages thereof can be realized by reference to the following detailed description in which reference is made to the accompanying drawings in which.

DETAILED DESCRIPTION OF THE INVENTION

Product design for electronic devices have become a very important criteria for sales success. Such popular electronic devices as the Ipod are greatly simplified and have a clean industrial design. For certain applications where the product designer wants to place a user input function on the device housing, but does not want to change or affect the product housing appearance, a capacitance sensing electrode can be used in conjunction with a metalized or metal housing that deflects under applied force. Since the amount of deflection is very small, on the order of about 0.001 of an inch, conventional electronic device housing can be converted to incorporate a user input zone using the fact that many of these types of housings are typically made from a polymer material and are plated with a conductive metal already present for electromagnetic emissions and susceptibility requirements. Another more recent trend is to use metal as the housing structure. When this housing is connected to the ground reference of a circuit that measures capacitance, a deflection of the housing relative to the capacitance electrode can form a basis for a user input device.

Figure 1:
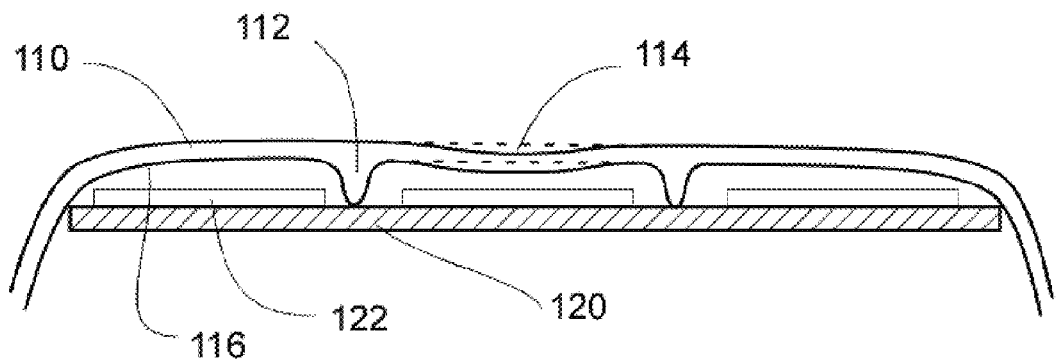
FIG. 1 is a cross-section of the first preferred embodiment of the invention.

FIG. 1 shows a first preferred embodiment of the invention where the deformable contact force-sensitive zone of the electronic housing 110 is shown suspended by a linear support means protruding therefrom such as a ridge 112 at an offset distance from the rigid non-deformable base 120 forming a gap. The design of the linear support means can outline a predetermined selection and size of buttons and switches for each particular application as needed. The first conductive layer 116 is formed on the inside surface of the housing. As an example, the inside surface 116 of the contact force-sensitive user input housing zone 110 can be metalized, printed, vacuum-deposited, sprayed or painted with a conductive material if the housing isn't made entirely from a conductive material such as metal in the first place. It is then connected to the ground reference of a circuit that can measure the capacitance between the inside surface 116 of the first conductive layer and a second conductive layer 122. The electrode of the second conductive layer 122 can be formed by printed circuit board 120 etching method or by printing a conductive paint over a rigid base 120. Since the first conductive layer is separated from the second conductive layer with a predefined gap distance, a capacitance sensor is therefore formed therebetween and incorporated into the housing itself. The user input zone of the housing body contains the housing sections between the linear support means which are all made relatively thin and deformable under pressure. When a user applies force on that section, the housing deflects down proportionally to the force applied as shown from the normal undeflected state indicated by a pair of dashed lines 114. This deflection changes the capacitance between the two conductive layers, which can be measured by the above described circuit and interpreted as an input signal for the electronic device at a particular location on the housing. Moreover, the degree of deflection can also be detected by the same circuit such that the input device can detect the level of force applied to the housing.

Various dielectric compressible structures can be placed optionally between the two conductive layers to fill the air gap and to form a more comprehensive capacitance sensor.

Figure 2:
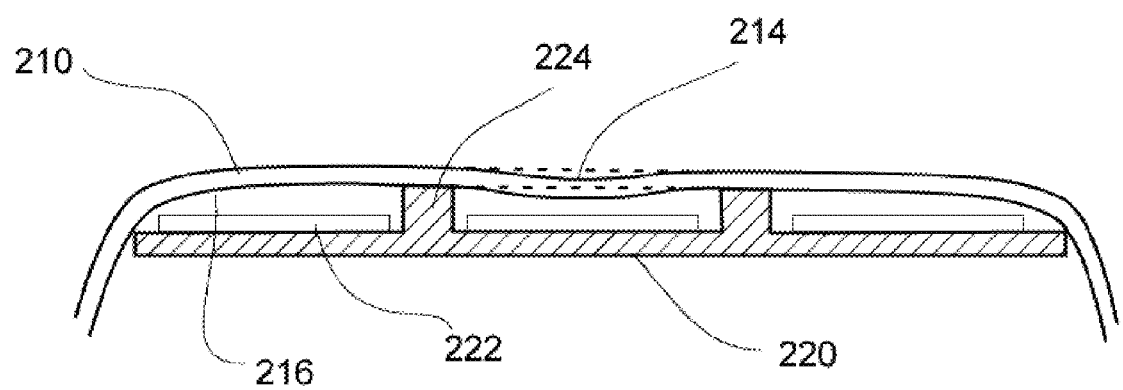
FIG. 2 is a cross-section of the second preferred embodiment of the invention.

FIG. 2 shows a second embodiment of the invention where the electronic housing 210 has a contact force-sensitive deformable zone made sufficiently thin such that when a user applies force over that zone, the housing deflects as shown from the normal undeflected state indicated by a pair of dashed lines 214. The capacitance sensor is formed between the inside conductive surface 216 of the housing 210 (first conductive layer) and the second conductive layer 222 of the rigid base 220. The thin housing could be made from plastic or metal and is supported by a linear support means such as columns 224 with an air gap separating it from the rigid base 220. In this embodiment, linear support means are incorporated into the rigid base 220 as opposed to being a part of the housing 210. The sections between the support means form the buttons of the user input zone.

As with the first embodiment, the inside surface of the housing 210 is metalized or painted with a conductive material if it isn't made entirely from a conductive material already. It is then connected to the ground reference of a circuit that can measure the capacitance between by the first conductive layer 216 and second conductive layer 222. The second conductive layer 222 can be formed by printed circuit board 220 etching method or by printing a conductive paint over the base 220.

In a further development of that concept, the linear support means can be made rigid or compressible and can also be optionally made as a separate part altogether, such as for example a plurality of rubber strips. Further, more than one of such linear support means can be used together to resist deflection of the housing over a single button area (not shown).

Figure 3:
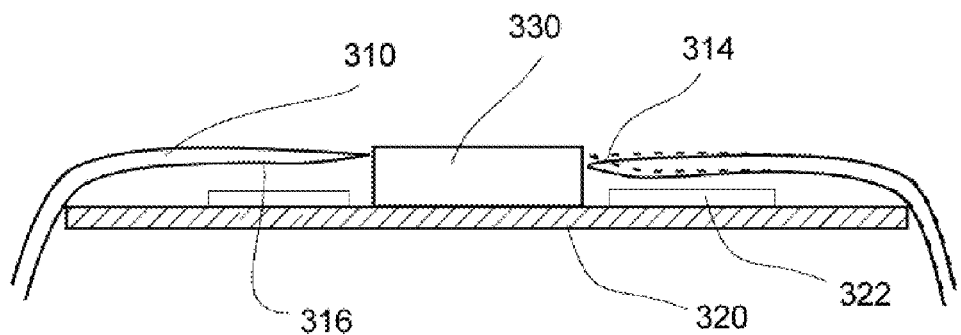
FIG. 3 is a cross-section of the third preferred embodiment of the invention.

FIG. 3 shows a third embodiment of the invention where the electronic housing 310 is suspended in a cantilever fashion away from the opening in the housing such that when a user applies force on a user input zone 310, the housing deflects as shown from the nominal non-compressed state indicated by dashed lines 314. The thin housing could be made from plastic or metal. This embodiment shows an element 330 protruding from the rigid base 320 through the opening in the housing 310. This element may be a display module, a high resolution input device or may serve other function for the electronic device.

The inside surface of the housing 310 is again metalized or painted with a conductive material if it isn't made from a conductive material and connected to the ground reference of a circuit that can measure the capacitance formed by 316 and electrode 322. The electrode 322 can be formed by printed circuit board 320 etching method or by printing a conductive paint over a base 320.

Optional linear supporting means can be used to support certain regions of the touch-sensitive zone of the housing (not shown) as may be dictated by the outline of the user input buttons.

Metal sheets can be used to form the housing of the electronic device. Finite Element Analysis has indicated that for the best performance of this invention, the range of stainless steel sheet thickness usable to construct the housing is between 0.001 and 0.007 of an inch, preferably about 0.004-0.005 of an inch. For aluminum, this range is about 0.001 to 0.012 of an inch, and preferably about 0.006 to 0.008 of an inch. For plastics, this range is broader at about 0.001 to 0.040 of an inch, with the preferred range of about 0.015 to 0.025 of an inch depending on the polymer.

Figure 4:
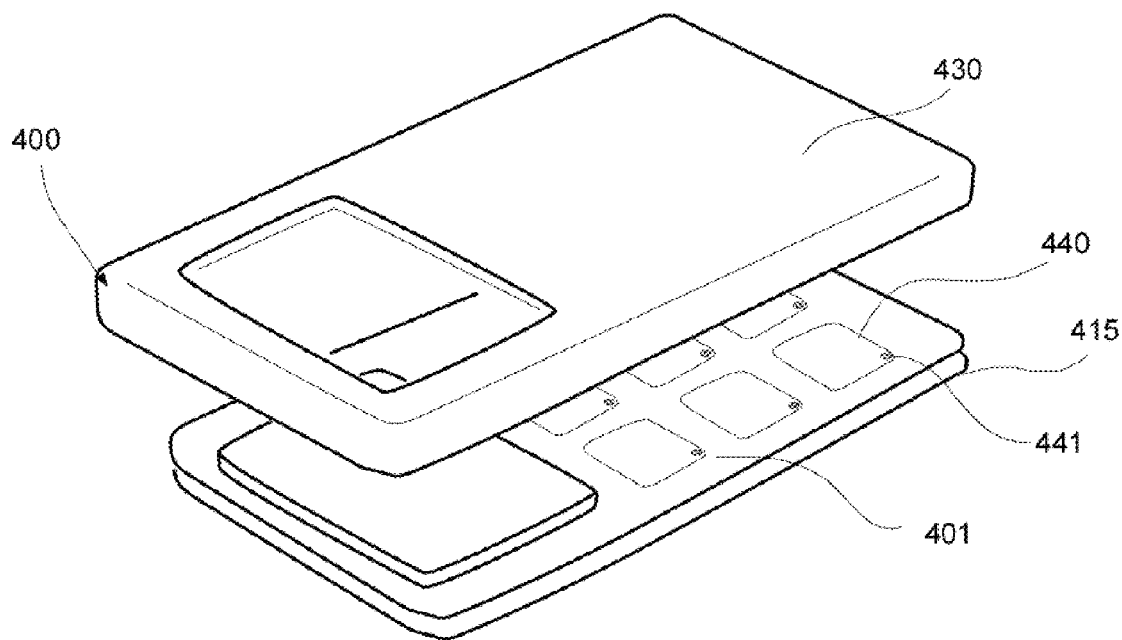
FIG. 4 is a general example of an electronic device with housing incorporating a user input zone.

FIG. 4 shows a general example of an electronic device using a housing of the present invention. The housing 400 of the electronic device comprises a bottom half 415 and the top half having a deformable contact force-sensitive user input zone 430. The zone 430 is made to have a conductive inside surface forming a first conductive layer. The rigid base 401 has button-shaped electrodes 440 forming a second conductive layer and facing the inside surface of the housing 400 while spaced apart therefrom. A capacitance sensor is therefore formed having a number of buttons therein. Each button location 440 is equipped with a separate electrical connection 441 connecting this location to a capacitance measuring circuit (not shown). The user input zone 430 may have an indicia indicating the location and size of the buttons to the user (not shown).

Figure 5:
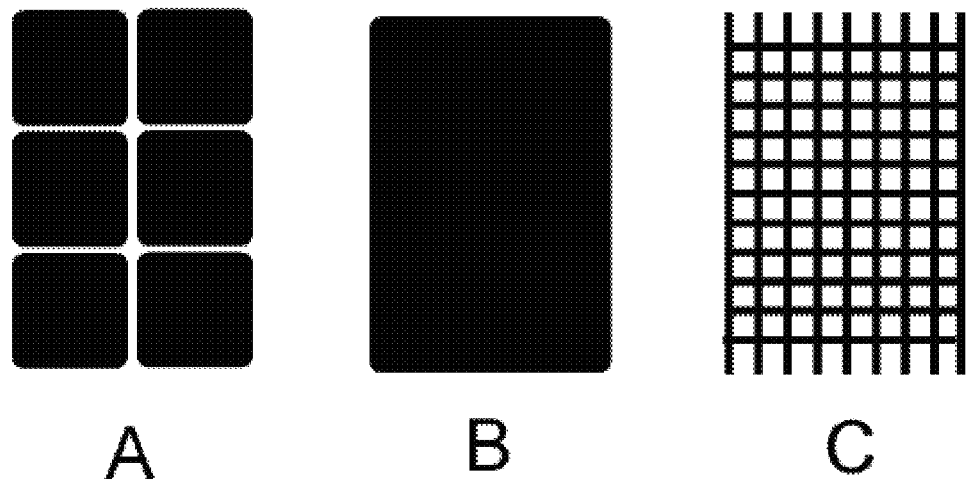
FIG. 5 shows one advantageous example of the electrode patterns for the fourth embodiment of the housing of the present invention.

FIG. 5 shows a fourth embodiment of the invention combining a touch-sensitive proximity sensor functionality in addition to the housing as a contact force input device. This is achieved by making the first conductive layer of the inside surface of the housing to have a mesh or some other similar non-solid pattern defining areas of its presence and absence.

Figure 6:
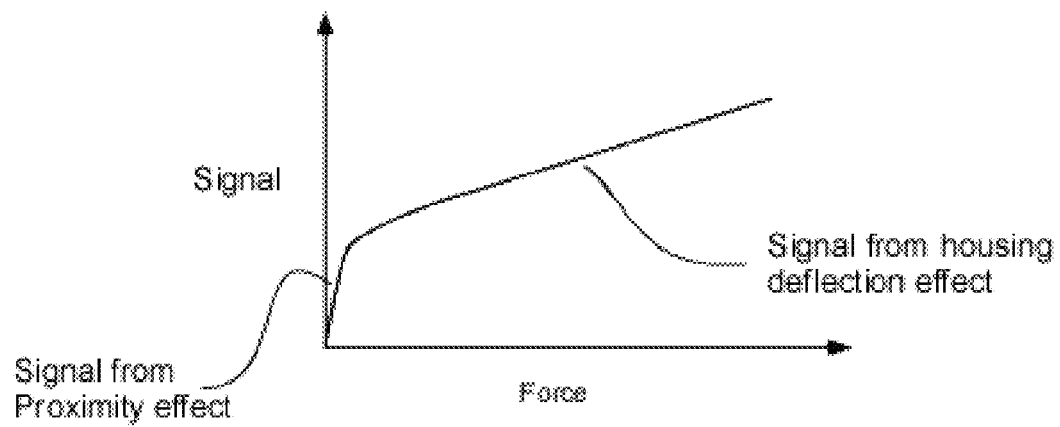
FIG. 6 shows a typical signal vs. force chart.

FIG. 5a shows the button-shaped pattern of electrodes for the second conductive layer on the rigid base made for example as a printed circuit board (PCB). FIG. 5b shows the corresponding traditional first conductive layer on the inside surface of the housing, which is a continuous metalized surface. By substituting the continuous first conductive layer of the housing with a mesh or non-continuous conductive surface, additional functionality of the proximity sensor can be obtained. An example of such mesh electrode design is shown on FIG. 5c. When the user moves their finger towards the housing, the finger acts as a ground electrode object thus allowing the circuitry of the device to detect the presence of the finger and its location and therefore generate an input signal. When force is applied to the housing, the mesh conductive layer deflects closer to the rigid base pcb thus increasing the capacitance even further as described previously. By selectively changing the mesh size, the percentage of the housing acting like a proximity sensor in the areas of absence of the first electrode layer or a force sensor in the areas of its presence can be tuned for the needs of a particular application. This dual mode of operation can provide the benefits of a light touch scroll realized by a proximity touch sensor while allowing a more definitive push button selection though the housing as a second input mode of operation. FIG. 6 shows an example of such sensor output—the first zone of input comes from proximity function and the second zone of input comes from capacitance measurement.

Figure 7:
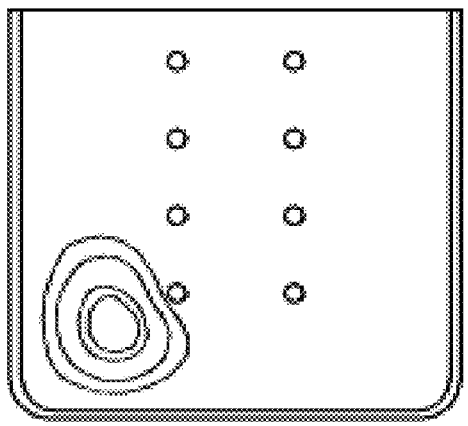
FIG. 7 shows various deflection contour maps with same level of force and contact area.
Figure 7:
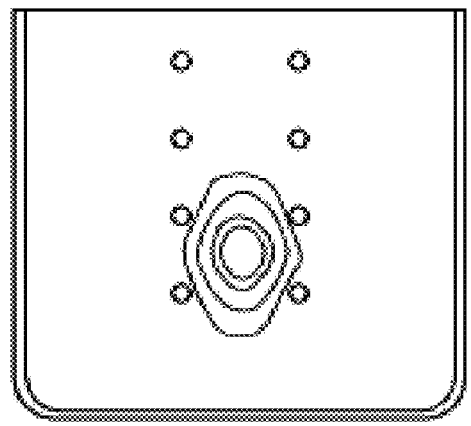
Figure 7:
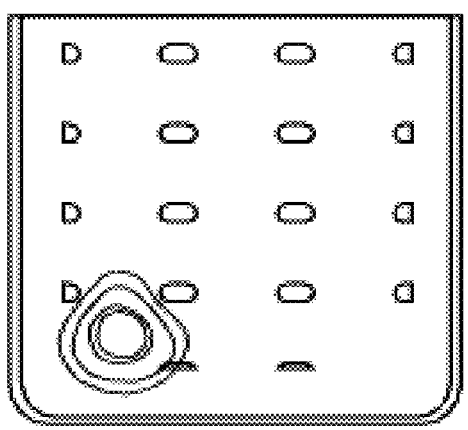
Figure 7:
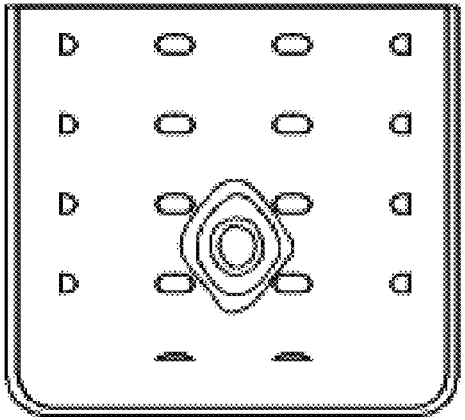

FIG. 7 shows two different designs of the present invention where the support structure shape is optimized to provide more uniform and localized deformation. In panel A, due to a larger area not supported at the corners, pressing the lower left button causes a response from the adjacent upper button therefore potentially causing unwanted errors. This effect was reduced by making the support structures wider thus preventing the deformation into the upper portion of the housing as shown in panel C. Similar effects can be seen for panel B where a circular contact area created an elongated deformation due to the spacing of the support not being square. As shown in panel D, making the supports wider localized the deformation and made it more confined to the contact area while maintaining the non-square buttons typically found on cell phones.

Although the invention herein has been described with respect to particular embodiments, it is understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

I claim:

1. A housing for an electronic device with integrated dual user input capability comprising:

a non-conductive rigid housing enclosure including a deformable user input zone having a conductive inside surface as a first conductive layer, said first conductive layer is non-continuous defining areas of its presence and absense.

a rigid base inside said housing enclosure spaced apart from said inside surface of the user input zone at a predetermined gap distance, said base having a second conductive layer facing said first conductive layer, a capacitance measuring circuit connected to both said first and second conductive layers and forming a capacitance sensor therebetween, said sensor is responsive to deformation of said deformable user input zone towards said rigid base but without touching thereof caused by applying force onto said input zone, said deformation causing a change in capacitance between said first and said second conductive layers, said change in capacitance being detected by said capacitance measuring circuit and transmitted as a first user input signal to said electronic device, wherein said input zone configured for operating as a proportional force measurement device, said capacitance measuring circuit is further adapted to provide a second user input signal by detecting a location and change in capacitance of said second conductive layer when a ground electrode object is placed in the vicinity thereof but without deforming of said deformable user input zone, wherein said input zone is configured for operating as a proximity sensor, whereby said housing of said electronic device is providing a dual user input capability of a proportional force-sensing capacitance sensor responsive to housing deformation and the proximal presence of a ground electrode object without housing deformation.

2. The device as in claim 1 further comprising a support means separating said first and second conductive layers and defining the shape of the user input zone.

3. The device as in claim 2, wherein said support means are made integral with the housing and protruding therefrom towards said rigid base.

4. The device as in claim 2, wherein said support means are made integral with said rigid base and protruding therefrom towards said inside surface of said housing.

5. The device as in claim 2, wherein said support means are made from a compressible material.

6. The device as in claim 1 further comprising a compressible dielectric layer filling the space between said first and said second conductive layers.

7. The device as in claim 1, wherein said user input zone of said housing is made from a conductive material.

8. The device as in claim 1, wherein said housing is made from a non-conductive material and said first conductive layer is made by applying a conductive material onto said inside surface or embedded into the housing.

9. The device as in claim 8, wherein said applying of the conductive material is achieved using a process selected from a group consisting of spraying, coating, painting, etching, vacuum-depositing, printing, co-molding, and co-lamination.

10. The device as in claim 1, wherein said second conductive layer having a plurality of buttons, said capacitance measuring circuitry adapted to detect a location of the user input in addition to said change in capacitance measured at the same location and use both as input signals to said electronic device.

* * * * *